Dec. 15, 1959  G. L. JONES  2,916,918
ERECTING MEANS FOR GYRO-VERTICALS
Filed July 15, 1959
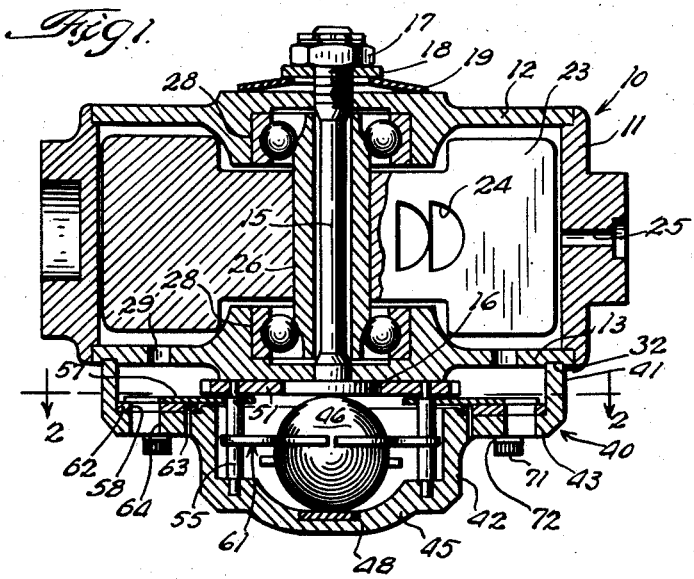
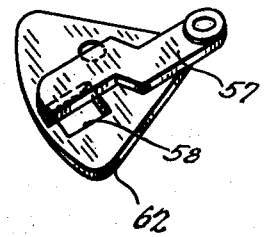
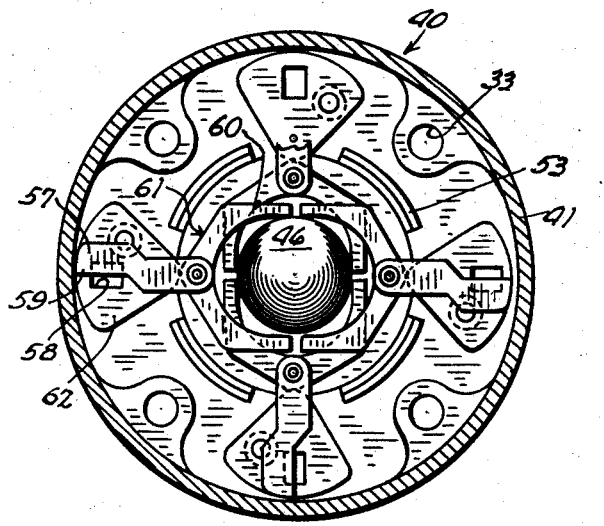
INVENTOR.
George Lester Jones
BY

United States Patent Office 2,916,918
Patented Dec. 15, 1959

2,916,918

ERECTING MEANS FOR GYRO-VERTICALS

George Lester Jones, Marne, Mich.

Application July 15, 1959, Serial No. 827,185

9 Claims. (Cl. 74—5.42)

This invention relates to gyro-verticals or artificial horizon instruments.

The principal object of the invention is to provide means responsive to departure of the gyro spin axis from true vertical which is effective to restore the axis to such vertical in a far more accurate and reliable manner and which is free of overshoot.

Another object is to provide in erecting means as aforesaid which may be calibrated with a greater degree of accuracy than has heretofore been possible and with greater facility.

A further object is to provide erecting means which is self-contained for ease of assembly with a variety of gyro housings and to facilitate servicing and replacement.

Other objects and advantages will appear from the ensuing description which, taken with the accompanying drawing, discloses a preferred mode of carrying the invention into practice.

In this drawing:

Fig. 1 is a vertical cross section through a typical gyro including its casing and the improved erecting means of the invention, but separated from the gimbal;

Fig. 2 is a cross section taken on the line 2—2 of Fig. 1; and

Fig. 3 is a detail of the adjustable shutter portion of the exhaust air port together with one of the vanes cooperative with the port.

Regarded in its broad aspect the inveniton is particularly adapted to an air-driven gyro and comprises a housing adapted to be secured to the lower end of the gyro casing. The housing is provided with a compartment having a fiducial floor portion normal to the gyro spin axis upon which a sphere may freely roll laterally in all directions under the influence of gravity as the axis departs from vertical and therefore represents, by its instantaneous position, the departure of the gyro axis from vertical. An adjacent surface of the gyro casing prevents the sphere from shifting vertically under momentum imparted by pitching movements of the airplane. The apertured ends of two pairs of levers embrace the sphere—one pair above and one pair below the equatorial plane of the sphere—with a free, but not loose, fit whereby change in position of the sphere is effective to rock the levers in directions and over angles proportional to lateral displacement of the sphere. The levers are pivoted in the housing and their opposite ends are constituted as vanes movable across individual ports provided in the housing. A passage or passages in the gyro casing allow for exhaust of air therefrom to the housing and out of the ports in this latter. Due to the differential movement of the levers the vanes open and close their individual ports in corresponding differential areas for escape of air. The velocity of flow therefrom, evidenced as jets reactive on the co-joined gyro casing and housing, being proportioned to the active area of the ports, results in a predominating resultant flow vector which reacts on the housing to return the gyro axis to vertical. In a collateral aspect the invention comprehends means for calibrating the several ports in the form of adjustable shutters which, once adjusted, are fixed for that gyro.

Turning now to the drawing, I have shown a casing 10 including an annular wall 11, an upper end wall 12 and a lower end wall 13. These may be assembled in any convenient manner, e.g. a bolt 15 having an extended head 16, (having an additional function to appear) a nut 17, a plain washer 18 and a dished, tensioning washer 19 whereby the end walls 12 and 13 may be reliably held and the ball or other bearings of the rotor, preloaded.

The rotor 23 is conventional, including buckets or pockets 24 for impingement by the air stream which enters at 25. Rotatable support is provided by a hollow hub 26 formed at its ends for bearing on the balls of two bearings 28 mounted in the associated end plates 12 and 13. Exhaust from the casing 10 is via one or more openings 29 in the end plate 13.

The erecting mechanism of the invention is self-contained and comprises a preferably circular housing 40 including two cup-shaped parts—one of larger diameter, 41 and the other of smaller diameter, 42, joined by an annular web 43. The housing 40 is accurately positioned coaxially with the gyro rotor axis by a groove 32 in the end wall 13 and is secured to the gyro casing by screws (not shown) passing through bores 33 in the housing. The lower wall 45 of the part 42 receives a metal sphere 46 adapted to roll freely, except as frictionally restrained by the parts operated thereby, over some predetermined extent upon a hardened insert 48, it being understood that the housing 40 will, in practice, comprise light weight material which is soft compared with that of the sphere.

An auxiliary plate 51 is tightly fitted into a plurality of segmental flanges 53 upstanding from the periphery of the housing part 42. This plate and the floor of the part 42 are bored to receive four spindles 55 constituting the individual axes of four levers now to be described.

Each lever includes an arm 61, suitably apertured in an elongated sense, e.g. bifurcate, including furcations 60 spaced apart approximately the diameter of the sphere 46 substantially to embrace the same adjacent its equatorial plane. The arm 61 is fixed to its associated spindle 55 in any acceptable manner. Also secured to each spindle is a vane 57 adapted to obturate an associated, preferably rectangular, aperture 58. It will be observed that, in the normal or centered position of the sphere 46, the working edge 59 of the vane bisects the aperture 58. The aperture 58 is formed in a sector-shaped shutter 62 (Fig. 3) which is carried against the interior of the wall 43 of the housing 40 for angular adjustment about a pivot pin 63. In the normal position of the shutter 62 the aperture 58 therein is in register with a corresponding aperture 64 through the wall 43. By swinging the shutter 62 more or less of the aperture 64 may be uncovered to increase or decrease the effective area thereof and hence the velocity of air flow therethrough in inverse ratio.

From the foregoing it will have been comprehended that departure of the gyro spin axis from vertical, as would occur as a result of movement of the gimbals upon which the gyro casing is carried relative to the aircraft, will result in the sphere 46 rolling in some lateral direction upon the plane of the plate 48, which plane is parallel to a horizontal plane through the centroid of the aircraft. In so doing the sphere actuates the lever arms 61 differentially which, in turn, exposes a greater effective area of certain ports 58 and a lesser effective area of the other. Thus, the velocity of the individual air jets therethrough is altered correspondingly and results in a net vector of air velocity reacting on the gyro casing in the proper direction and with the proper magnitude to restore the gyro spin axis to vertical. As the axis is restored the port openings resume their normal area by virtue of the sphere 46 re-occupying its normal position (as shown). It will be understood that, in practice, the sphere is constantly shifting its position and will, only ideally, remain for long in the normal position illustrated. Stated otherwise, the correction occasioned by the four reacting air jets issuing from the ports 64 is constantly applied in a smooth, uninterrupted manner. The head 16 of the bolt 15 restrains unwanted shifting of the sphere in a vertical direction.

Where, herein, I refer to the action of the sphere-controlled mechanism in influencing the issuing jets of exhaust air in a "differential" manner I intend to describe the joint action of each pair of opposed levers, including an arm 61 and vane 57, in opening and closing the associated ports 58. Regarding each pair of opposed levers as acting jointly upon movement of the sphere in one direction or the other, viz. either fore and aft or athwartships respectively or combinations thereof, joint movement of one pair of levers will open one port and close the opposite port so that, insofar as concerns the reactive effect of that pair of jets, it is the difference in the open area of the ports which induces an erecting torque of the proper direction and magnitude. Accordingly the adjective "differential" or the adverb "differentially" refers to the difference of volume of air flow from one of the ports measured against the other rather than the absolute value of the volume of air flow from any one port.

In a collateral aspect the invention comprises the inclusion of adjustable exit ports for initial calibration of the erecting action on a Scorsby or equivalent apparatus. To this end each port comprises two sections: one, the aperture 58 in the shutter plate 62 and two, the aperture 64 in the wall 43 of the housing 40. A screw 71 clears through an oversized hole in the wall 43 and the screw is then threadedly received in the shutter plate 62. Thus, when the screw is manipulated the plate may be swung in one direction or the other to vary the alignment of the apertures 58 and 64, the position of the vane 57 being that corresponding to the sphere 46 in the position at which the gyro spin axis is vertical. In this way the velocity of each air stream may be initially regulated or calibrated for that particular instrument. When acceptable calibration has been accomplished the screws 71 are tightened against their lockwashers 72. By utilizing a filister head or socket head screw the head may serve as a handle for shifting the associated shutter plate. Inasmuch as the extent of shifting of the several shutter plates 62 in the average case is extremely small the oversized hole through which the screw 71 passes is only slightly larger than the shank of the screw and therefore cannot, with clarity, be shown on the drawing. The apertures 58 and 64 may be of a different shape and size in order to obtain any desired change in velocity for a selected movement of the shutter plate, i.e. straight line calibration is comprehended.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. In an erector for a gyro-vertical having a gyroscopic element including a rotor in an essentially-closed casing, the rotor of said element being rotated by air, and the casing having an air inlet and an air outlet, the improvement comprising: an essentially-closed housing adapted to be secured to the casing, the air outlet of the casing opening into said housing, said housing having a cup-shaped compartment to receive a sphere for lateral rolling movement over a predetermined area, the compartment having a horizontal fiducial surface whereupon the sphere may roll upon departure of said surface from horizontal, a plurality of ports in the wall of said housing through which air entering said housing may eventually escape, a plurality of apertured members, the apertures of which receive said sphere at substantially the equatorial plane thereof, a pivot for each member whereby rolling of the sphere actuates said members differentially, and a plurality of vanes, one individual to each member adapted for actuation thereby and individual to each port for obturating said ports selectively in a variable manner upon movement of the members to vary the velocity of the escaping air differentially depending upon the instantaneous position of the sphere.

2. The combination in accordance with claim 1 wherein said members are provided with furcations defining the aperture therein.

3. The combination in accordance with claim 1 wherein each said member and its associated vane is secured to a common pivot.

4. The combination in accordance with claim 1 wherein a plate is secured to said housing above said ball and the pivots are received at their ends in said plate and a wall of said housing respectively.

5. The combination in accordance with claim 4 further characterized in that said housing is provided with a flange and said plate is a snug demountable fit within said flange.

6. In a gyro-vertical including an air-driven rotor, a casing enclosing said rotor and supporting the same for rotation, said casing having an air inlet and an air outlet, erecting means comprising: an essentially closed housing mounted on said casing, the air outlet existing in the space enclosed by the housing, said housing having at least four equally spaced air exit passages, a sphere in said housing, a compartment in said housing within which said sphere is received having a fiducial surface upon which the sphere may roll in response to departure of the rotor axis from vertical, two pairs of apertured lever arms, the sphere being received in said apertures the sphere with a running fit at substantially the equatorial plane thereof, the arms being pivoted on the housing for swinging movement to follow the excursions of the sphere, each arm being provided with a vane adapted to open and close one of said passages to vary the effective cross sectional area thereof proportionately to movement of said arms whereby the respective velocities of the air jets issuing from the passages are varied differentially to provide a resultant reactant vector to restore the rotor axis to vertical.

7. In a gyro-vertical for aircraft which comprises a gyroscope including a gyro casing having an air outlet, means for universally supporting the same on horizontal axes in substantially neutral equilibrium and an air-driven rotor in said casing having a normally vertical spinning axis, an air port for spinning the rotor, a housing mounted on the supporting means, a sphere within the housing, a normally horizontal flat fiducial surface in said housing upon which said sphere may undergo excursion in any lateral direction in response to the rotor leaving its spinning axis, a plurality of pairs of levers in said housing on a vertical axis, each lever having an elongated aperture for receiving the sphere with running clearance therebetween whereby excursion of the sphere actuates said levers as a group in a differential manner, the housing receiving exhaust air from the outlet, a plurality of pairs of ports in said housing for exhaust of air therefrom, the members of each pair of ports being oppositely disposed, a plurality of pairs of vanes, one individual to each port adapted to vary the cross sectional area of said ports to vary the volume of exhaust therefrom, means connecting one of said levers to each of said vanes, each pair of vanes being adapted to expose normally equal cross sectional areas of a pair of opposed ports whereby, on relative inclination of the gyroscope said sphere actuates said pairs of vanes through said levers to close one port of a pair more than the other to create an unbalanced exhaust of air and consequent reactive torque at an angle to restore the rotor axis to vertical.

8. In a gyroscopic artificial horizon which includes a gyro rotor and rotor casing, means for supporting the same in substantially neutral equilibrium and with the rotor having a normally vertical spin axis, said casing having an air inlet and an air outlet, gravitationally responsive means for maintaining the spin axis erect comprising an essentially-closed housing mounted on said casing, a sphere carried in said housing for rolling movement in a lateral direction upon departure of the spin axis from vertical, a plurality of pairs of ports for exhaust of air from said housing, the members of each pair being opposed whereby exhaust of air therethrough provide jets exerting reactive torques on the casing in a direction to restore the rotor axis to vertical, a vane for each port for varying the volume of air exhausted therethrough and a linkage between the sphere and each vane for translating movement of the sphere into corresponding movement of the vane.

9. The combination in accordance with claim 8 further characterized in that each port comprises two portions, one shiftable with respect to the other to vary the available total cross sectional area of the port for calibration of the torques exerted by the jets.

References Cited in the file of this patent

UNITED STATES PATENTS

| | | |
|---|---|---|
| 2,207,717 | Carter | July 16, 1940 |
| 2,373,120 | Kenyon | Apr. 10, 1945 |

FOREIGN PATENTS

| | | |
|---|---|---|
| 118,552 | Sweden | Apr. 8, 1947 |

UNITED STATES PATENT OFFICE
CERTIFICATE OF CORRECTION

Patent No. 2,916,918                                                                 December 15, 1959

George Lester Jones

It is hereby certified that error appears in the printed specification of the above numbered patent requiring correction and that the said Letters Patent should read as corrected below.

Column 4, line 28, for "existing" read -- exiting --; line 36, strike out "the sphere".

Signed and sealed this 24th day of May 1960.

(SEAL)
Attest:

KARL H. AXLINE
Attesting Officer

ROBERT C. WATSON
                                                         Commissioner of Patents